US012574618B2

(12) United States Patent
Kawai et al.

(10) Patent No.: US 12,574,618 B2
(45) Date of Patent: Mar. 10, 2026

(54) IMAGING APPARATUS AND CONTROL METHOD OF IMAGING APPARATUS

(71) Applicant: FUJIFILM Corporation, Tokyo (JP)

(72) Inventors: Tomoyuki Kawai, Saitama (JP);
Shinichi Shimotsu, Saitama (JP);
Tetsuya Fujikawa, Saitama (JP);
Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 116 days.

(21) Appl. No.: 18/590,861

(22) Filed: Feb. 28, 2024

(65) Prior Publication Data

US 2024/0276085 A1     Aug. 15, 2024

Related U.S. Application Data

(63) Continuation of application No. PCT/JP2022/029056, filed on Jul. 28, 2022.

(30) Foreign Application Priority Data

Sep. 9, 2021     (JP) ................................. 2021-146726

(51) Int. Cl.
*H04N 23/52* (2023.01)
*H04N 23/20* (2023.01)
*H04N 23/60* (2023.01)

(52) U.S. Cl.
CPC ............. *H04N 23/52* (2023.01); *H04N 23/20* (2023.01); *H04N 23/60* (2023.01)

(58) Field of Classification Search
CPC ........ H04N 23/20; H04N 23/21; H04N 23/23; H04N 23/52; H04N 23/60
See application file for complete search history.

(56) References Cited

U.S. PATENT DOCUMENTS

2013/0057716 A1* 3/2013 Asakura ............... H04N 23/667
                                                            348/E5.041
2013/0091348 A1* 4/2013 Kwon ................... G05B 15/02
                                                            713/100

(Continued)

FOREIGN PATENT DOCUMENTS

CN          103616789          3/2014
JP          H08107526          4/1996

(Continued)

OTHER PUBLICATIONS

"International Search Report (Form PCT/ISA/210) of PCT/JP2022/ 029056," mailed on Oct. 11, 2022, with English translation thereof, pp. 1-7.

(Continued)

*Primary Examiner* — Daniel M Pasiewicz
(74) *Attorney, Agent, or Firm* — JCIPRNET

(57) ABSTRACT

Provided are an imaging apparatus and a control method of the imaging apparatus which are for reducing noise included in an output image of an imaging element having a photosensitive layer on a silicon substrate. An imaging apparatus (1-1) includes an imaging element (12) having a photosensitive layer on a silicon substrate, a cooling unit (14) that cools the imaging element (12), a temperature detection unit (16) that detects a temperature of the imaging element (12), and a CPU (26) functioning as a processor, in which the processor (26) controls the cooling unit (14) based on a first frame rate at which the imaging element is driven (12) and the temperature of the imaging element (12) detected by the temperature detection unit (16).

8 Claims, 11 Drawing Sheets

(56)                     References Cited

U.S. PATENT DOCUMENTS

| | | | |
|---|---|---|---|
| 2020/0014860 A1* | 1/2020 | Kaibara | ................ H04N 23/80 |
| 2022/0381617 A1 | 12/2022 | Wakabayashi et al. | |

FOREIGN PATENT DOCUMENTS

| | | |
|---|---|---|
| JP | 2004117873 | 4/2004 |
| JP | 2010041127 | 2/2010 |
| JP | 2013162192 | 8/2013 |
| JP | 2019220741 | 12/2019 |
| WO | 2021132184 | 7/2021 |

OTHER PUBLICATIONS

"Written Opinion of the International Searching Authority (Form PCT/ISA/237) of PCT/JP2022/029056," mailed on Oct. 11, 2022, with English translation thereof, pp. 1-8.

* cited by examiner

| FRAME RATE<br>SENSOR<br>TEMPERATURE | 100 | 30 | 4 |
|---|---|---|---|
| 0°C | 10500000 | 30000000 | 15000000000 |
| 20°C | 10500000 | 30000000 | 7000000000 |
| 40°C | 10500000 | 15000000 | 1500000000 |

| FRAME RATE⟍ SENSOR TEMPERATURE | 100 | 30 | 4 |
|---|---|---|---|
| 0°C | 1050000000 | 900000000 | 60000000000 |
| 20°C | 1050000000 | 900000000 | 28000000000 |
| 40°C | 1050000000 | 450000000 | 6000000000 |

| FRAME RATE [fps] | | TARGET TEMPERATURE [°C] |
| --- | --- | --- |
| | ≥ 120 | 40 |
| < 120 | ≥ 100 | 30 |
| < 100 | ≥ 60 | 20 |
| < 60 | ≥ 10 | 10 |
| < 10 | ≥ 2 | 0 |
| < 2 | | −5 |

| TEMPERATURE [°C] | | OPERATION FRAME RATE [fps] |
|---|---|---|
| | ≥ 40 | 120 |
| < 40 | ≥ 30 | 100 |
| < 30 | ≥ 20 | 60 |
| < 20 | ≥ 10 | 20 |
| < 10 | ≥ 0 | 10 |
| < 0 | | 4 |

15-1 VD SYNCHRONIZATION SIGNAL 15-2 SENSOR PIXEL READOUT 15-3 IMAGE ADDITION AND OUTPUT IMAGE

IMAGING APPARATUS AND CONTROL METHOD OF IMAGING APPARATUS

CROSS-REFERENCE TO RELATED APPLICATIONS

The present application is a Continuation of PCT International Application No. PCT/JP2022/029056 filed on Jul. 28, 2022 claiming priority under 35 U.S.C § 119(a) to Japanese Patent Application No. 2021-146726 filed on Sep. 9, 2021. Each of the above applications is hereby expressly incorporated by reference, in its entirety, into the present application.

BACKGROUND OF THE INVENTION

1. Field of the Invention

The present invention relates to an imaging apparatus and a control method of the imaging apparatus, and particularly to a technology for reducing noise included in an output image of an imaging element.

2. Description of the Related Art

JP2013-162192A describes a problem in which, during time-lapse imaging, a temperature of an imaging element increases and decreases depending on the surrounding environment temperature, the fixed pattern noise caused by the dark current increases and decreases, and the amount of noise in the recorded video changes, resulting in the recording of an unnatural video.

In order to solve this problem, in a case where the time-lapse imaging is performed, the imaging apparatus described in JP2013-162192A sets a temperature of the imaging element at the time of acquiring an initial video as a target temperature, cools or heats the imaging element using a cooling system to maintain the temperature of the imaging element at the target temperature, so that the noise caused by the dark current of the imaging element is kept constant during time-lapse imaging.

In addition, JP2019-220741A describes a document camera comprising an imaging unit that images a subject such as paper and that generates image information, a detection unit that detects a temperature of the imaging unit, and a controller that changes a frame rate of the imaging unit based on the temperature of the imaging unit detected by the detection unit. The document camera can suppress generation of noise in the image information without using a cooling fan.

SUMMARY OF THE INVENTION

One embodiment according to the technology of the present disclosure provides an imaging apparatus and a control method of the imaging apparatus which are for reducing noise included in an output image of an imaging element having a photosensitive layer on a silicon substrate.

According to a first aspect of the present invention, there is provided an imaging apparatus comprising an imaging element having a photosensitive layer on a silicon substrate, a cooling unit that cools the imaging element, a temperature detection unit that detects a temperature of the imaging element, and a processor, in which the processor controls the cooling unit based on a first frame rate at which the imaging element is driven and the temperature of the imaging element detected by the temperature detection unit.

In the imaging apparatus according to a second aspect of the present invention, it is preferable that the imaging element is sensitive to a short wavelength infra-red band.

In the imaging apparatus according to a third aspect of the present invention, it is preferable that the processor controls the cooling unit to perform cooling in a case where the first frame rate is slower than a reference frame rate.

In the imaging apparatus according to a fourth aspect of the present invention, it is preferable that the processor controls the cooling unit through setting to a second temperature higher than a first temperature corresponding to a reference frame rate in a case where the first frame rate is faster than the reference frame rate, and controls the cooling unit through setting to a third temperature lower than the first temperature in a case where the first frame rate is slower than the reference frame rate.

In the imaging apparatus according to a fifth aspect of the present invention, the imaging apparatus further comprises a first memory that stores a target temperature according to a frame rate, and it is preferable that the processor acquires a corresponding target temperature from the first memory according to the first frame rate, and controls the cooling unit based on the acquired target temperature and the temperature of the imaging element detected by the temperature detection unit.

In the imaging apparatus according to a sixth aspect of the present invention, it is preferable that the processor weakens or interrupts cooling of the imaging element by the cooling unit in a case where the temperature of the imaging element detected by the temperature detection unit is lower than the target temperature.

According to a seventh aspect of the present invention, there is provided an imaging apparatus comprising an imaging element having a photosensitive layer on a silicon substrate, a temperature detection unit that detects a temperature of the imaging element, and a processor, in which the processor determines a first frame rate based on the temperature of the imaging element detected by the temperature detection unit, and drives the imaging element at the determined first frame rate.

In the imaging apparatus according to an eighth aspect of the present invention, the imaging apparatus further comprises a second memory that stores the first frame rate according to the temperature of the imaging element, and it is preferable that the processor acquires a corresponding first frame rate from the second memory based on the temperature of the imaging element detected by the temperature detection unit, and drives the imaging element at the acquired first frame rate.

In the imaging apparatus according to a ninth aspect of the present invention, it is preferable that, in a setting of outputting an image at a second frame rate lower than the first frame rate, in a case where the temperature of the imaging element detected by the temperature detection unit is equal to or more than a reference temperature, the processor adds a frame image at the first frame rate and outputs the image at the second frame rate.

In the imaging apparatus according to a tenth aspect of the present invention, it is preferable that, in a setting of outputting an image at a second frame rate lower than the first frame rate, in a case where the temperature of the imaging element detected by the temperature detection unit is less than a reference temperature, the processor decreases the first frame rate to the second frame rate.

In the imaging apparatus according to an eleventh aspect of the present invention, it is preferable that the processor drives the imaging element at the first frame rate and starts imaging in a case where the temperature of the imaging element detected by the temperature detection unit reaches a target temperature.

According to a twelfth aspect of the present invention, there is provided a control method of an imaging apparatus including an imaging element having a photosensitive layer on a silicon substrate, a cooling unit that cools the imaging element, a temperature detection unit that detects a temperature of the imaging element, and a processor, the control method comprising a step of driving the imaging element at a first frame rate and capturing time-series images via the processor, a step of detecting the temperature of the imaging element via the temperature detection unit, and a step of controlling the cooling unit based on the first frame rate and the detected temperature of the imaging element and cooling the imaging element via the processor.

In the control method of an imaging apparatus according to a thirteenth aspect of the present invention, it is preferable that the imaging element is sensitive to a short wavelength infra-red band.

In the control method of an imaging apparatus according to a fourteenth aspect of the present invention, it is preferable that, in the step of cooling the imaging element, the cooling unit is controlled through setting to a second temperature higher than a first temperature corresponding to a reference frame rate in a case where the first frame rate is faster than the reference frame rate, and the cooling unit is controlled through setting to a third temperature lower than the first temperature in a case where the first frame rate is slower than the reference frame rate.

According to a fifteenth aspect of the present invention, there is provided a control method of an imaging apparatus including an imaging element having a photosensitive layer on a silicon substrate, a temperature detection unit that detects a temperature of the imaging element, and a processor, the control method comprising a step of driving the imaging element at a first frame rate and capturing time-series images via the processor, a step of detecting the temperature of the imaging element via the temperature detection unit, a step of determining the first frame rate, based on the temperature of the imaging element detected by the temperature detection unit, via the processor, and a step of driving the imaging element at the determined first frame rate via the processor.

BRIEF DESCRIPTION OF THE DRAWINGS

FIG. 11 is a block diagram showing the second embodiment of the imaging apparatus according to the present invention.

DESCRIPTION OF THE PREFERRED
EMBODIMENTS

Hereinafter, an imaging apparatus and a control method of the imaging apparatus according to preferred embodiments of the present invention will be described with reference to the accompanying drawings.

First Embodiment of Imaging Apparatus

Figure 1:
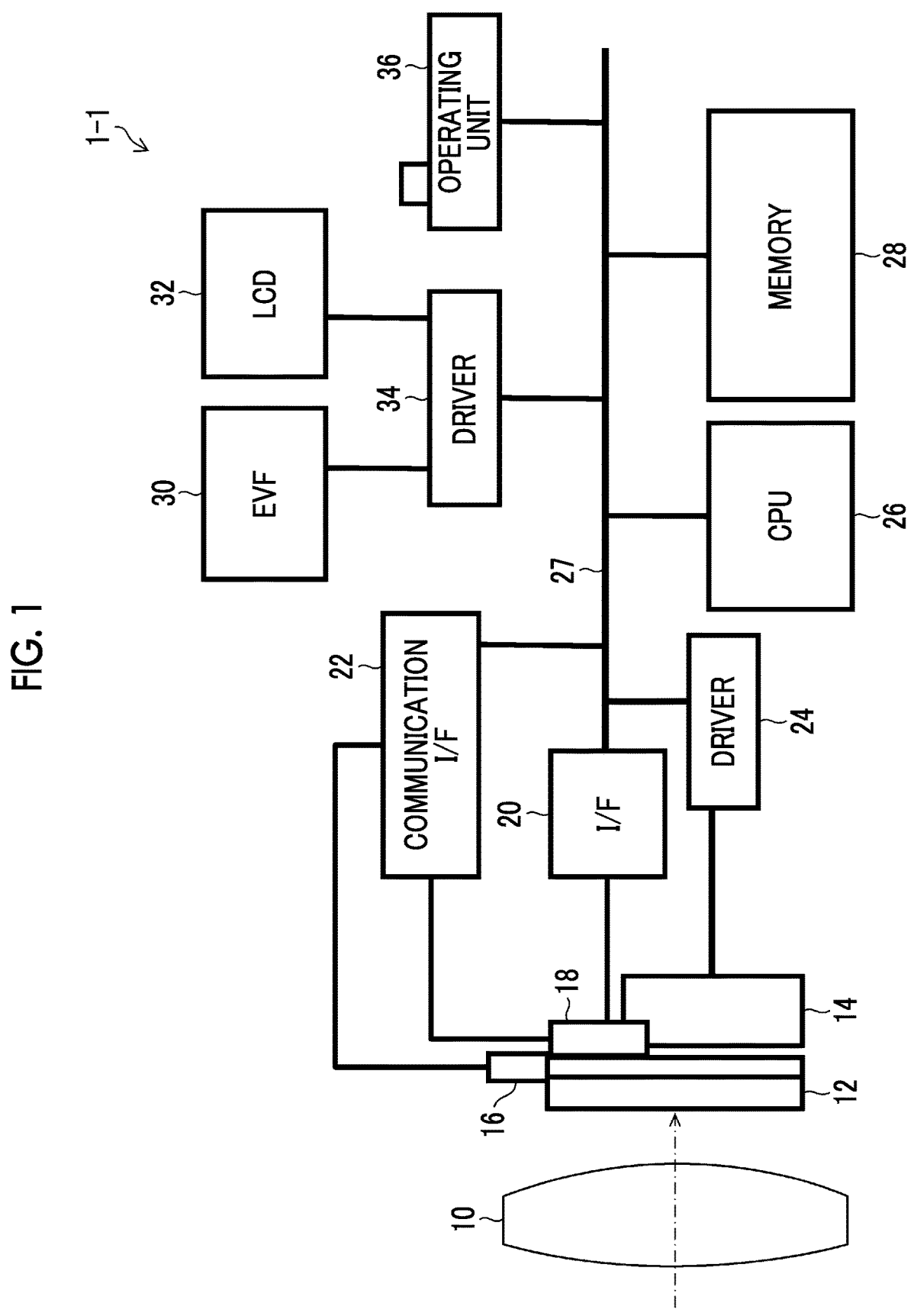
FIG. 1 is a block diagram showing a first embodiment of an imaging apparatus according to the present invention.

FIG. 1 is a block diagram showing a first embodiment of the imaging apparatus according to the present invention.

The imaging apparatus 1-1 of the first embodiment shown in FIG. 1 comprises an imaging lens 10, an imaging element 12, a cooling unit 14, a temperature detection unit 16, a central processing unit (CPU) 26, a memory 28, an electronic view finder (EVF) 30, a liquid crystal display (LCD) 32, an operating unit 36, and the like.

The imaging lens 10 forms an image of subject light from a subject on the imaging element 12. The imaging lens 10 may be fixed to an imaging apparatus main body or may be an interchangeable lens which is interchangeable.

The imaging element 12 is an image sensor having a photosensitive layer on a silicon substrate, and by providing a photosensitive layer (photosensitive film) sensitive to a short wavelength infra-red (SWIR) band on the silicon substrate constituting a readout circuit accessible to a two-dimensional address, can acquire an image of the short wavelength infra-red band (SWIR band).

Next, the characteristics of the imaging element sensitive to the SWIR band will be described.

Figures 2, 3:
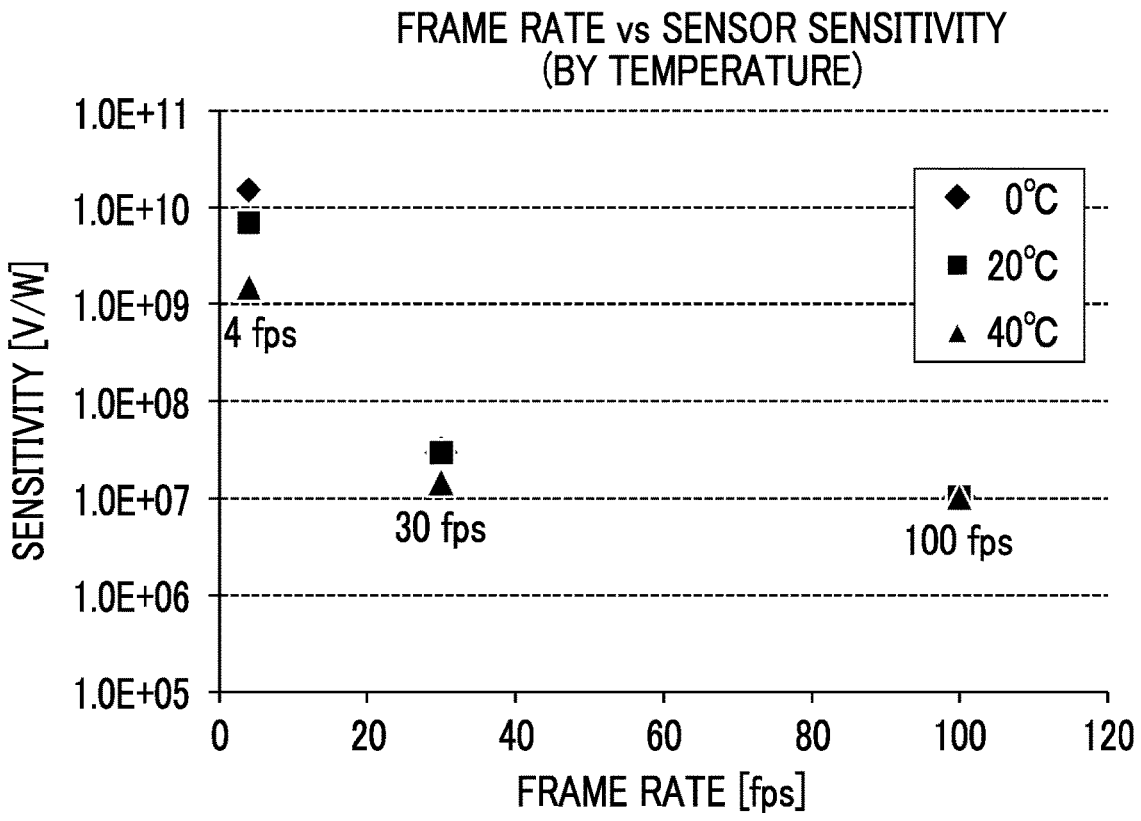
FIG. 2 is a graph showing, for each sensor temperature, an example of a relationship between a frame rate [fps] at which the imaging element sensitive to the SWIR band is driven and a sensor sensitivity [V/W].
FIG. 3 is a table showing numerical values corresponding to the graph in FIG. 2.

FIG. 2 is a graph showing, for each sensor temperature, an example of a relationship between a frame rate [fps] at which the imaging element sensitive to the SWIR band is driven and a sensor sensitivity [V/W].

In addition, FIG. 3 is a table showing numerical values corresponding to the graph in FIG. 2. That is, the graph in FIG. 2 is created based on the numerical values of the table in FIG. 3.

As shown in FIGS. 2 and 3, the imaging element sensitive to the SWIR band has a characteristic that the sensor sensitivity is higher as the frame rate at which the imaging element is driven is higher, and in a case where the frame rate is lower than 30 [fps], the sensor sensitivity increases exponentially.

In addition, even if the frame rate of the imaging element that is sensitive to the SWIR band is the same, the sensor sensitivity tends to increase in a case where the temperature of the imaging element is low, and this tendency is especially noticeable in a case where the frame rate is low.

The imaging element that is sensitive to the SWIR band has a large amount of noise caused by kTC noise (thermal noise) or a dark current.

For example, it is known that in a case where a wavelength in the SWIR band has a photosensitive region by a quantum dot, spectral sensitivity characteristics vary depending on the diameter of the quantum dot. In general, since the volume of the object varies depending on the temperature, it is assumed that the diameter of the quantum dot varies depending on the temperature, and as a result, the spectral sensitivity characteristics depend on the temperature. Therefore, in the imaging element sensitive to the SWIR band in which a photosensitive film made of quantum dots is laminated, the sensitivity may fluctuate depending on the sensor temperature.

In the imaging element sensitive to the SWIR band, it is effective to control the cooling of the imaging element and the frame rate of the imaging in order to maintain the desired sensor sensitivity (capturing of a low-noise image).

Figures 4, 5:
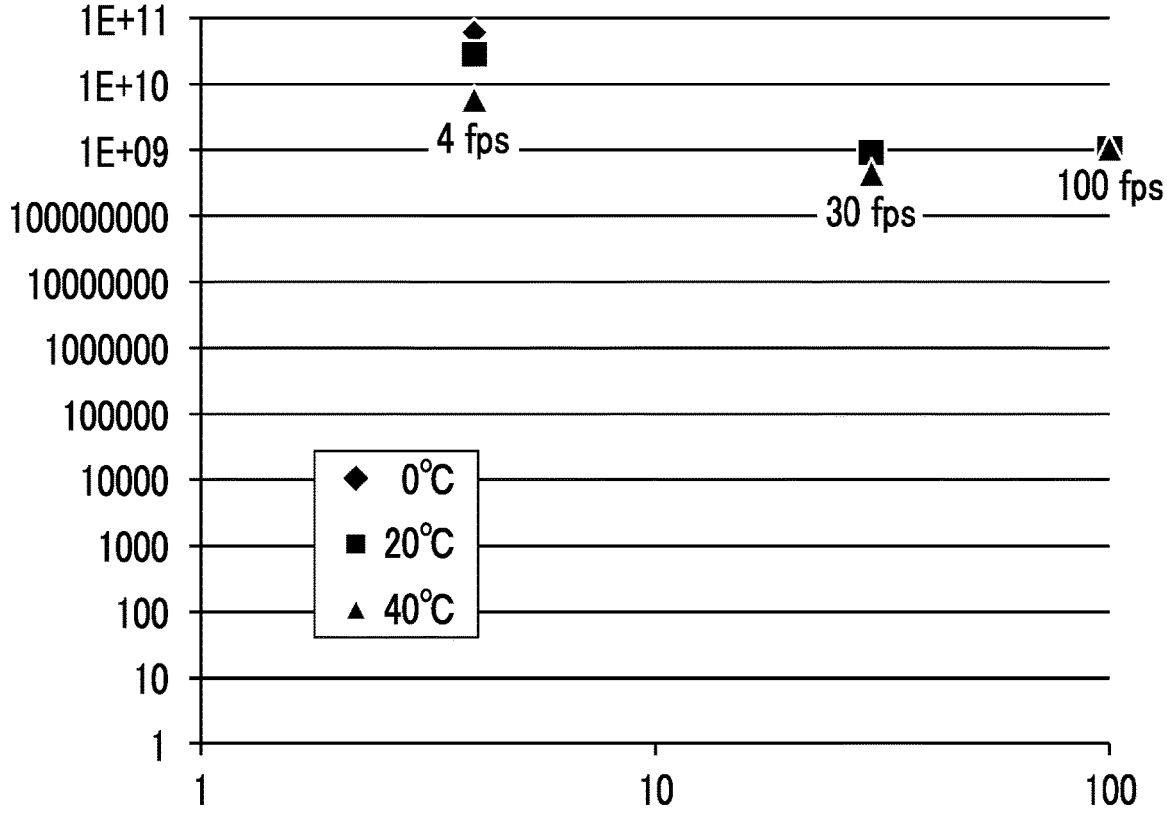
FIG. 4 is a graph showing, for each sensor temperature, another example of a relationship between the frame rate [fps] at which the imaging element sensitive to the SWIR band is driven and the sensor sensitivity [V/W].
FIG. 5 is a table showing numerical values corresponding to the graph in FIG. 4.

FIG. 4 is a graph showing, for each sensor temperature, another example of a relationship between the frame rate [fps] at which the imaging element sensitive to the SWIR band is driven and the sensor sensitivity [V/W].

In addition, FIG. 5 is a table showing numerical values corresponding to the graph in FIG. 4. That is, the graph in FIG. 4 is created based on the numerical values of the table in FIG. 5.

The other examples shown in FIGS. 4 and 5 shows the same characteristics as the example shown in FIGS. 2 and 3, but differ from the characteristics shown in FIGS. 2 and 3 in that the sensor sensitivity also is lowered in a case where the frame rate is changed from 100 [fps] to 30 [fps] (the frame rate is lowered).

Therefore, in the imaging element that is sensitive to the SWIR band, in a case where cooling of the imaging element and frame rate of imaging are controlled in order to maintain the desired sensor sensitivity, it is preferable to perform the control according to the characteristics of the imaging element to be controlled.

Returning to FIG. 1, the cooling unit 14 cools the imaging element 12 and electrically cools it using, for example, a Peltier element. Various cooling units such as a cooler using a refrigerant can be applied to the cooling unit 14.

The temperature detection unit 16 is a temperature sensor for detecting a temperature of the imaging element 12, detects the temperature of the imaging element 12, converts the detected temperature into an electric signal (temperature detection signal), and outputs the electric signal.

The CPU 26 is connected to the bus 27.

In addition to the CPU 26, an interface (I/F) 20, a communication I/F 22, the memory 28, drivers 24 and 34, and the operating unit 36 are connected to the bus 27, and the CPU 26 exchanges various control signals and data with each unit in the imaging apparatus via the bus 27.

The CPU 26, which functions as a processor, integrally controls each unit in the imaging apparatus by means of a control program stored in the memory 28 or in the memory in the CPU 26, and extracts a processing program corresponding to each mode stored in the memory 28 or the like corresponding to a state signal from the operating unit 36 to execute each function of the imaging apparatus 1-1.

The operating unit 36 includes a power switch, a shutter release button, a shutter speed dial, an exposure correction dial, a MENU/OK key, a cross key, a play button, and the like.

The MENU/OK key is an operation key having both a function as a menu button for performing an instruction to display a menu on a screen of the LCD 32 and a function as an OK button for performing an instruction to confirm, execute, and the like of a selected content. The cross key is an operating unit that inputs instructions in four directions of up, down, right, and left, and functions as a button for selecting an item from a menu screen or instructing selection of various setting items from each menu. The play button is a button that is used to switch a mode to the playback mode for displaying captured and recorded static images or motion pictures on the LCD 32.

In addition, the CPU 26 comprises a function of controlling a frame rate at which the imaging element 12 is driven and the cooling unit 14.

The CPU 26 controls the cooling unit 14 based on the temperature of the imaging element detected by the temperature detection unit 16. The temperature detection signal is applied to the CPU 26 from the temperature detection unit 16 via the communication I/F 22, and the CPU 26 controls the cooling unit 14 via the driver 24 based on a target temperature set for the imaging element 12 and the temperature detection signal, and maintains the temperature of the imaging element 12 at the target temperature. Details of the control of the frame rate and the control of the cooling unit 14 via the CPU 26 will be described later.

The communication I/F 22 outputs control signals, such as an image readout instruction signal for controlling the imaging element 12 and an imaging frame synchronization signal, to an I/F and signal controller 18 in the imaging element 12 in response to the instructions from the CPU 26. The I/F and signal controller 18 performs control of reading out the image signal from the imaging element 12 based on the control signal input from the communication I/F 22. In addition, the I/F and signal controller 18 performs control of a timing at which the charge accumulated in each pixel of the imaging element 12 is discharged (reset) by the electronic shutter control signal input from the CPU 26 via the communication I/F 22, and performs an electronic shutter control to adjust a period (exposure period) from the reset of the charge to the image readout based on the imaging frame synchronization signal.

Further, the I/F and signal controller 18 includes an analog front end (AFE) circuit, processes the voltage signals (analog signals) readout from each pixel of the imaging element 12 and corresponding to the charges accumulated during the exposure period, and then outputs the digital image data to the I/F 20. The AFE circuit has a correlated double sampling circuit, an automatic gain control (AGC) circuit, and an analog-to-digital (A/D) converter.

The memory 28 includes a flash memory, a read-only memory (ROM), a random access memory (RAM), and the like.

The flash memory and the ROM are non-volatile memories that store various programs including firmware and image processing software, parameters for image processing, captured images (still images, motion pictures), and the like.

The RAM functions as a work region for processing via the CPU 26, and also temporarily stores firmware, other programs, or the like stored in the non-volatile memory. A part (RAM) of the memory 28 may be built in the CPU 26.

In addition, the CPU 26 functions as a digital signal processing unit that performs various types of digital signal processing on the image data that is temporarily stored in the memory 28 from the imaging element 12 via the I/F 20. That is, the CPU 26 performs digital signal processing such as offset processing, gain control processing including sensitivity correction, and gamma-correction processing on the image data temporarily stored in the memory 28, stores the image data after the digital signal processing in the memory 28 again, performs the compression processing of the image data for the image data for recording, and records the image file including the compressed data in the non-volatile memory. The digital signal processing described above may be performed by a circuit dedicated to the digital signal processing, which is different from the CPU 26.

The EVF 30 and the LCD 32 display various images based on image data for display added from the CPU 26 via the driver 34.

In a case where the EVF 30 or the LCD 32 displays the live view image, the CPU 26 outputs image data captured at a predetermined frame rate (for example, 30 fps or 60 fps) and subjected to the digital signal processing to the driver 34 for display. The driver 34 for display converts the input time-series image data into a signal format for display and sequentially outputs the converted time-series image data to the EVF 30 or the LCD 32. Accordingly, the captured image is displayed in real time on the EVF 30 or the LCD 32. In a case where an eye is brought close to the EVF 30 in the imaging mode, the display is automatically switched to the display of the EVF 30 due to the action of an eye sensor (not shown), and in a case where the eye is released, the display is switched to the display of the LCD 32.

The LCD 32 plays back and displays the captured image in the playback mode and also functions as a display that displays various menu screens.

Next, control of the cooling unit 14 in the imaging operation by the imaging apparatus 1-1 having the above-described configuration will be described.

Figure 6:
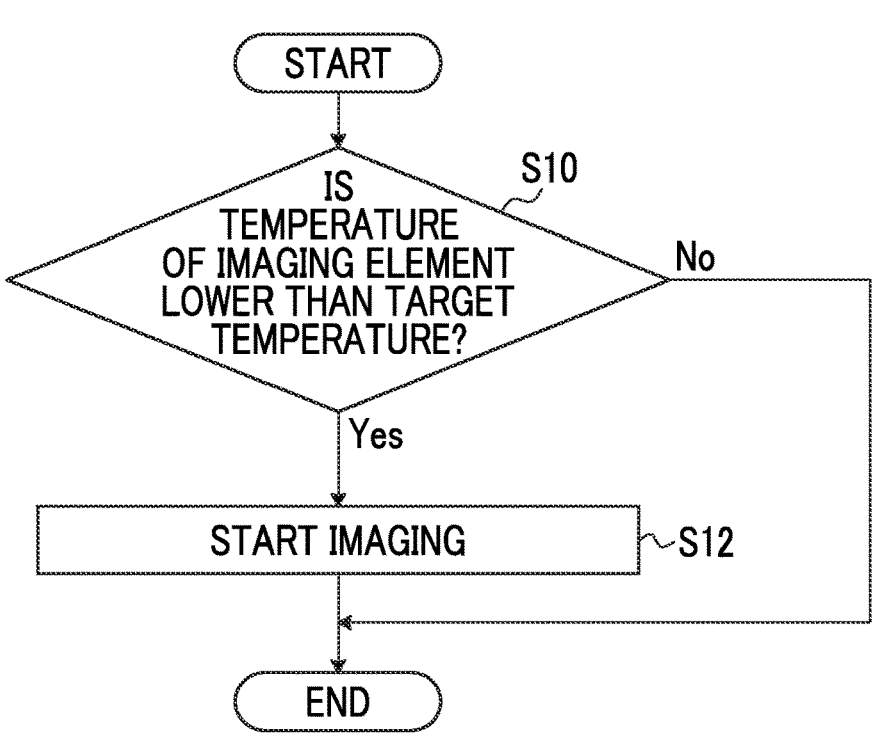
FIG. 6 is a flowchart showing an imaging start condition.

FIG. 6 is a flowchart showing an imaging start condition.

The imaging apparatus 1-1 that captures an image of the SWIR band is an apparatus that captures a high-sensitivity image for examination and monitoring of agricultural products and industrial products, and mainly captures a motion picture. It does not matter whether the captured motion picture is recorded or not.

In the imaging element sensitive to the SWIR band as shown in FIGS. 2 to 5, the sensor sensitivity changes depending on the temperature of the imaging element. The user sets the target temperature using the operating unit 36 such that the sensor sensitivity (low-noise image) required for the examination or the like can be obtained.

In FIG. 6, in a case where the power switch is turned on and the imaging is started at a frame rate (first frame rate) at which the imaging element 12 is driven, the CPU 26 determines whether or not the temperature of the imaging element 12, which is detected by the temperature detection unit 16, is lower than the set target temperature (Step S10).

In a case where determination is made that the temperature of the imaging element 12 is lower than the target temperature (in a case of "Yes"), the CPU 26 obtains a low-noise image required for an examination or the like to start the imaging (Step S12).

In a case where determination is made that the temperature of the imaging element 12 is higher than the target temperature (in a case of "No"), the CPU 26 ends it without starting the imaging.

To efficiently cool the imaging element 12, the driving of the imaging element 12 may be stopped until the imaging element 12 is cooled and reaches the target temperature. Since the heat generation of the imaging element 12 is suppressed, cooling can be performed quickly.

First Embodiment of Controlling Cooling Unit

Figure 7:
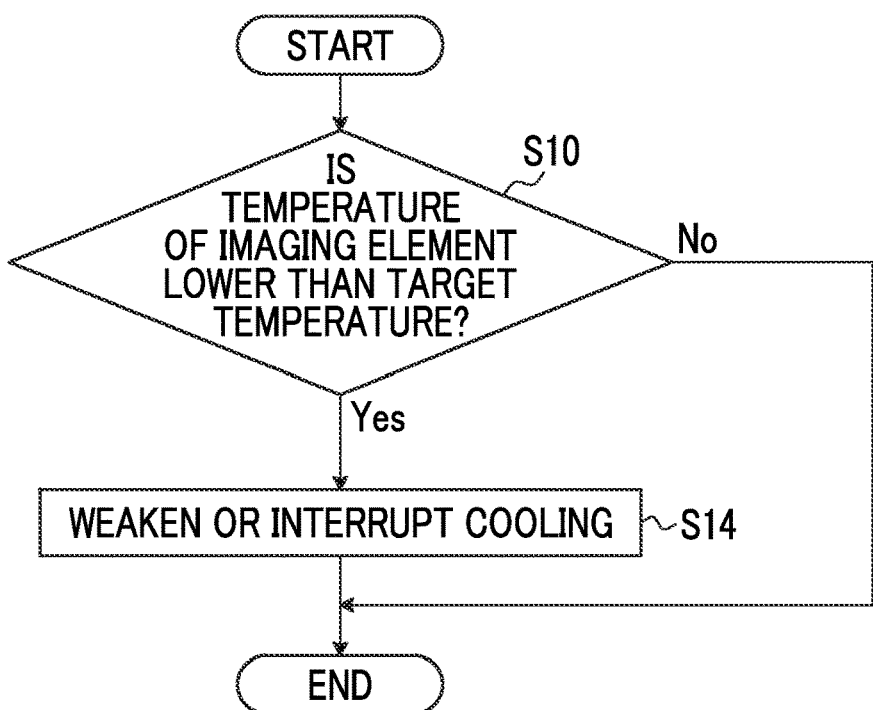
FIG. 7 is a flowchart showing a first embodiment of controlling a cooling unit.

FIG. 7 is a flowchart showing a first embodiment of controlling the cooling unit 14.

In FIG. 7, the CPU 26 determines whether or not the temperature of the imaging element 12, which is detected by the temperature detection unit 16 after the start of imaging, is lower than the target temperature (Step S10).

In a case where determination is made that the temperature of the imaging element 12 is lower than the target temperature (in a case of "Yes"), the CPU 26 weakens or interrupts (stops) the cooling of the imaging element 12 by the cooling unit 14 (Step S14).

Accordingly, in a case where the temperature reaches the target temperature, the cooling of the cooling unit 14 can be stopped and it is possible to perform more efficient control.

Second Embodiment of Controlling Cooling Unit

Figures 8, 9:
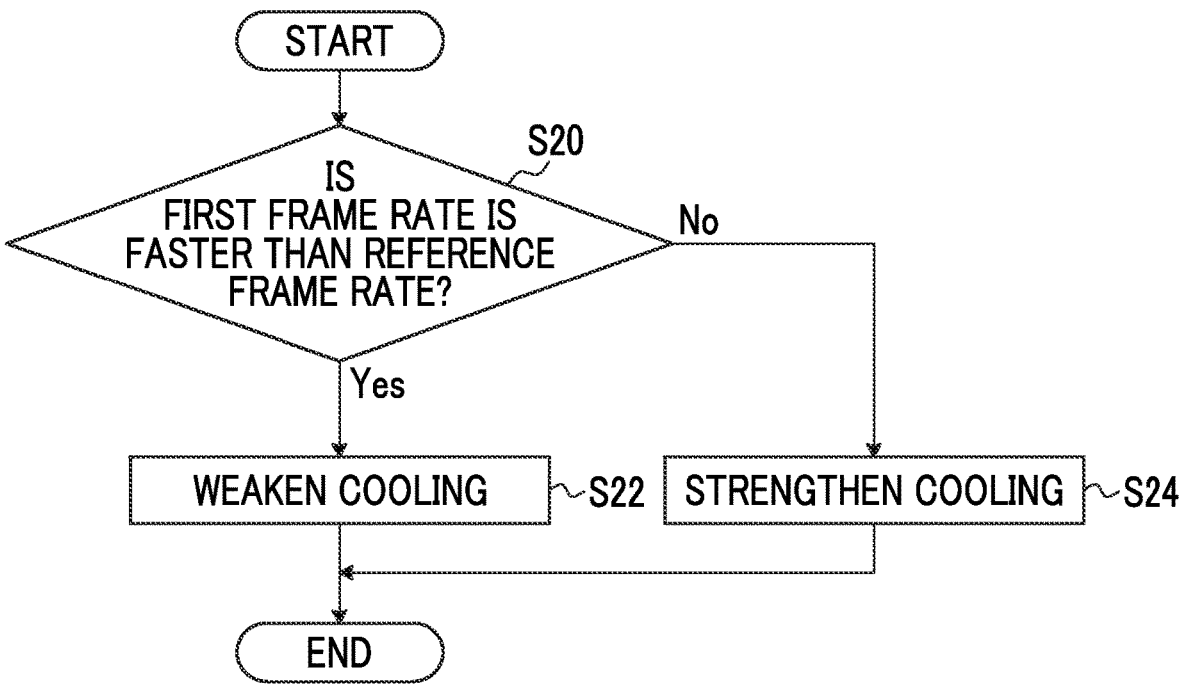
FIG. 8 is a flowchart showing a second embodiment of controlling a cooling unit.
FIG. 9 is a table showing a relationship between a set frame rate and a target temperature.

FIG. 8 is a flowchart showing a second embodiment of controlling the cooling unit 14.

In a case where the imaging apparatus 1-1 has a reference frame rate and drives the imaging element 12 at the reference frame rate, the CPU 26 controls the cooling unit 14 such that the temperature of the imaging element 12 is a temperature (first temperature) corresponding to the reference frame rate.

In FIG. 8, in a case where the imaging element 12 is driven at a frame rate (first frame rate) different from the reference frame rate, the CPU 26 determines whether or not the first frame rate is faster (higher) than the reference frame rate (Step S20).

In a case where determination is made that the first frame rate is faster than the reference frame rate (in a case of "Yes"), the CPU 26 weakens the cooling of the imaging element 12 by the cooling unit 14 (Step S22). That is, the CPU 26 controls the cooling unit 14 through setting to a temperature (second temperature) higher than the first temperature corresponding to the reference frame rate.

On the other hand, in a case where determination is made that the first frame rate is slower (lower) than the reference frame rate (in a case of "No"), the CPU 26 strengthens the cooling of the imaging element 12 by the cooling unit 14 (Step S24). That is, the CPU 26 controls the cooling unit 14 through setting to a temperature (third temperature) lower than the first temperature corresponding to the reference frame rate.

In preparation for the case where the sensor sensitivity decreases during long exposure (at low frame rate) in a case where the temperature of the imaging element 12 is high as described above, cooling can be efficiently controlled by strengthening cooling only during low frame rate imaging and weakening cooling during high frame rate imaging.

Third Embodiment of Controlling Cooling Unit

FIG. 9 is a table showing a relationship between the set frame rate and the target temperature.

According to the table shown in FIG. 9, as the frame rate is slower, the target temperature corresponding to the frame rate is set to be lower.

The memory 28 (first memory) stores the target temperature corresponding to the frame rate as shown in FIG. 9.

In a case where the frame rate at which the imaging element 12 is driven is set, the CPU 26 acquires a corresponding target temperature from the memory 28 in accordance with the set frame rate, and controls the cooling unit 14 based on the acquired target temperature and the temperature of the imaging element 12 detected by the temperature detection unit 16.

Figure 10:
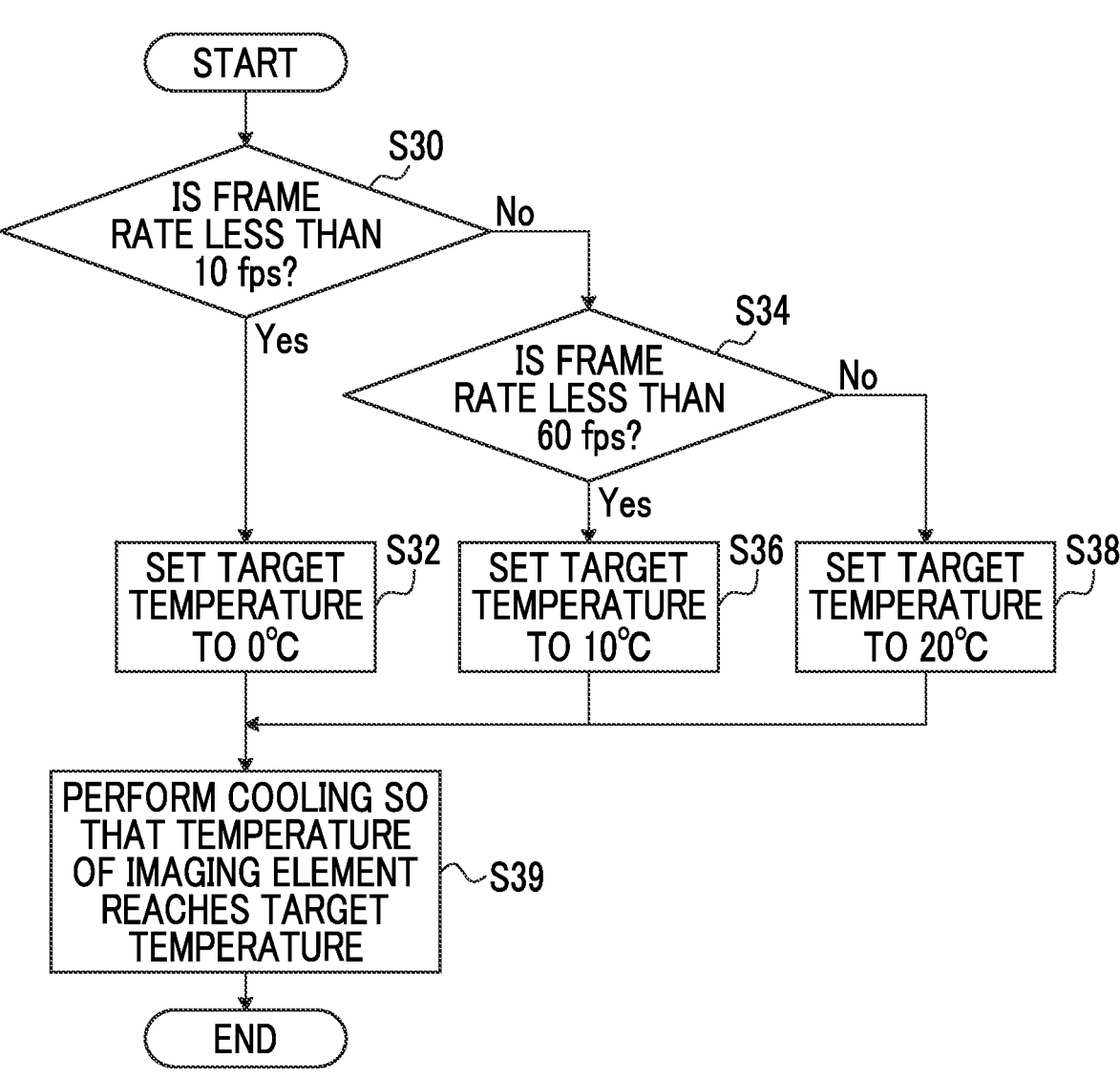
FIG. 10 is a flowchart showing a third embodiment of controlling a cooling unit.

FIG. 10 is a flowchart showing a third embodiment of controlling the cooling unit 14.

The flowchart shown in FIG. 10 sets the target temperature corresponding to the frame rate according to the table in FIG. 8.

In FIG. 10, the CPU 26 determines whether or not the frame rate (first frame rate) at which the imaging element 12 is driven is less than 10 fps (Step S30). In a case where determination is made that the frame rate at which the imaging element 12 is driven is less than 10 fps, the target temperature is set to 0° C. (Step S32).

In a case where the frame rate at which the imaging element 12 is driven is 10 fps or more, the CPU 26 further determines whether or not the frame rate is less than 60 fps (Step S34). In a case where determination is made that the frame rate at which the imaging element 12 is driven is less than 60 fps (that is, determination is made that the frame rate is 10 fps or more and less than 60 fps), the target temperature is set to 10° C. (Step S36).

In a case where the frame rate at which the imaging element 12 is driven is 60 fps or more, the CPU 26 sets the target temperature to 20° C. (Step S36).

In Step S32, Step S36, or Step S38, the CPU 26 controls the cooling unit 14 based on the target temperature set according to the frame rate and the temperature of the imaging element 12 detected by the temperature detection unit 16 so that the temperature of the imaging element 12 reaches the target temperature (Step S39).

By setting the target temperature according to the frame rate, the cooling unit 14 can be controlled more precisely and efficient control can be performed.

In the flowchart shown in FIG. 10, the frame rate is set in three stages, and a threshold value is set in two levels (10 fps, 60 fps), but of course, the frame rate may be set in more detail.

Second Embodiment of Imaging Apparatus

Figure 11:
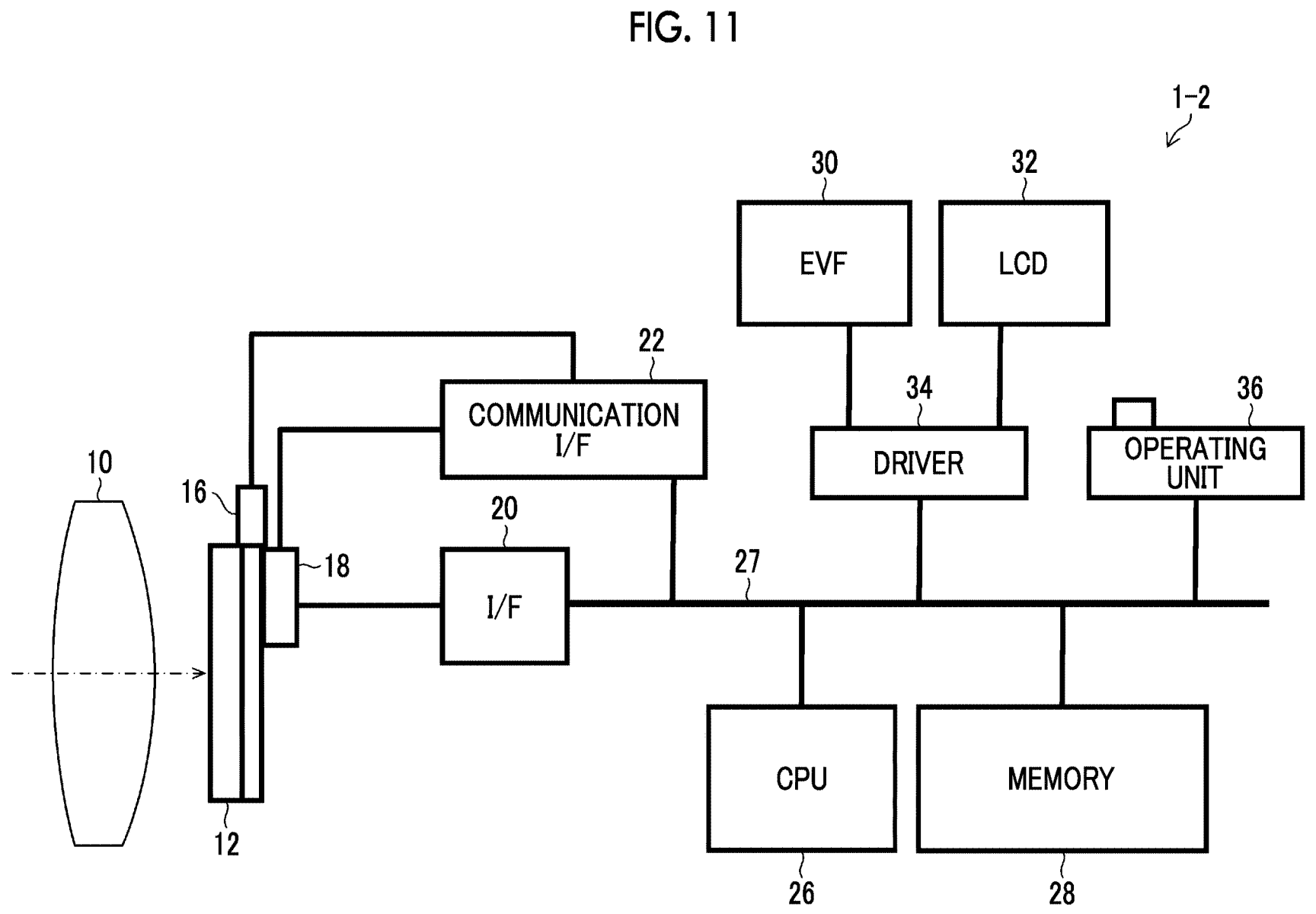

FIG. 11 is a block diagram showing a second embodiment of the imaging apparatus according to the present invention.

In FIG. 11, the same reference numerals are given to the portions common to the imaging apparatus 1-1 according to the first embodiment shown in FIG. 1, and the detailed description thereof will be omitted.

An imaging apparatus 1-2 of the second embodiment shown in FIG. 11 is different from the imaging apparatus 1-1 of the first embodiment in that the cooling unit 14 and the driver 24 are not provided.

The imaging apparatus 1-2 of the second embodiment controls the frame rate (first frame rate) at which the imaging element 12 is driven instead of cooling the imaging element 12. That is, the CPU 26 of the imaging apparatus 1-2 determines the frame rate at which the imaging element 12 is driven based on the temperature of the imaging element 12 detected by the temperature detection unit 16, and drives the imaging element 12 at the determined frame rate.

Accordingly, a low-noise image required for the examination or the like can be obtained regardless of the temperature of the imaging element 12.

Embodiment of Controlling Frame Rate

As shown in FIGS. 2 to 5, in the imaging element sensitive to the SWIR band, as the frame rate is slower (lower), the sensor sensitivity is higher. On the other hand, in the imaging element sensitive to the SWIR band, in a case of the same frame rate, as the temperature of the imaging element is higher, the sensor sensitivity is lower.

Therefore, in a case where the temperature of the imaging element becomes high, the frame rate at which the imaging element is driven is made fast (high) so that the sensor sensitivity (low-noise image) required for the examination or the like can be obtained.

Figures 12, 13:
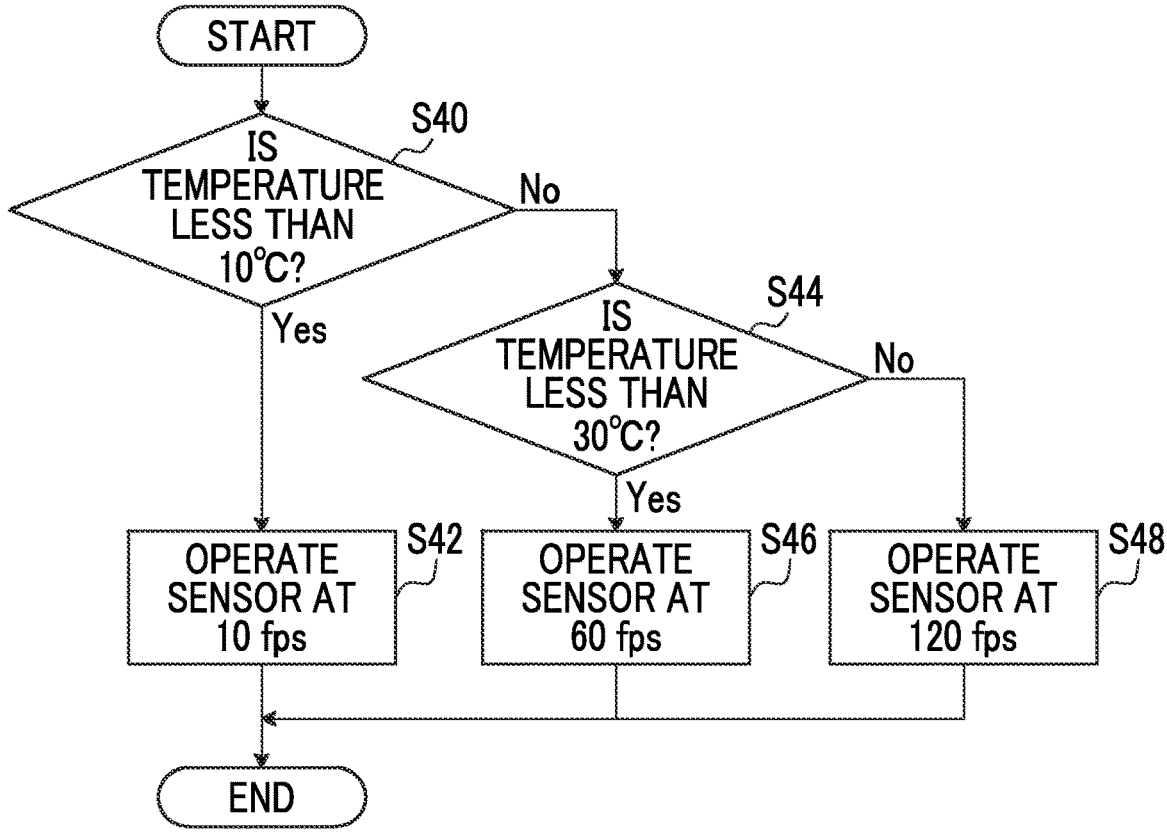
FIG. 12 is a table showing frame rates set in accordance with the temperatures of the imaging element.
FIG. 13 is a flowchart showing an embodiment of controlling a frame rate.

FIG. 12 is a table showing frame rates set in accordance with the temperatures of the imaging element.

According to the table shown in FIG. 12, as the temperature of the imaging element is higher, the frame rate corresponding to the temperature is set to be faster (higher).

The memory 28 (second memory) stores the frame rate (first frame rate) corresponding to the temperature of the imaging element 12 as shown in FIG. 12.

The CPU 26 acquires the frame rate corresponding to the temperature from the memory 28 based on the temperature of the imaging element 12 detected by the temperature detection unit 16, and drives the imaging element 12 at the acquired frame rate.

FIG. 13 is a flowchart showing an embodiment of controlling the frame rate.

In the flowchart shown in FIG. 13, the imaging element 12 is operated at a frame rate corresponding to the temperature of the imaging element 12 in accordance with the table in FIG. 12.

In FIG. 13, the CPU 26 determines whether or not the temperature of the imaging element 12 is less than 10° C. (Step S40). In a case where determination is made that the temperature of the imaging element 12 is less than 10° C., the imaging element 12 is operated at a frame rate of 10 fps (Step S42).

In a case where the temperature of the imaging element 12 is 10° C. or more, the CPU 26 further determines whether or not the temperature is less than 30° C. (Step S44). In a case where determination is made that the temperature of the imaging element 12 is less than 30° C. (that is, determination is made that the temperature is 10° C. or more and less than 30° C.), the imaging element 12 is operated at a frame rate of 60 fps (Step S46).

In a case where the temperature of the imaging element 12 is 30° C. or more, the CPU 26 operates the imaging element 12 at a frame rate of 120 fps (Step S48).

The low-noise image can be acquired by having the temperature detection unit 16 that detects the temperature of the imaging element 12, determining the frame rate of imaging from the detected temperature, and operating the imaging element 12 at the determined frame rate.

In this way, the frame rate at which the imaging element 12 is driven is varied according to the temperature of the imaging element 12. In order to cope with the decrease in sensitivity during long exposure (low frame rate), particularly in a case where the temperature is high, the frame rate is increased in a case where the temperature is high and the frame rate is decreased in a case where the temperature is low to enable long exposure.

Figure 14:
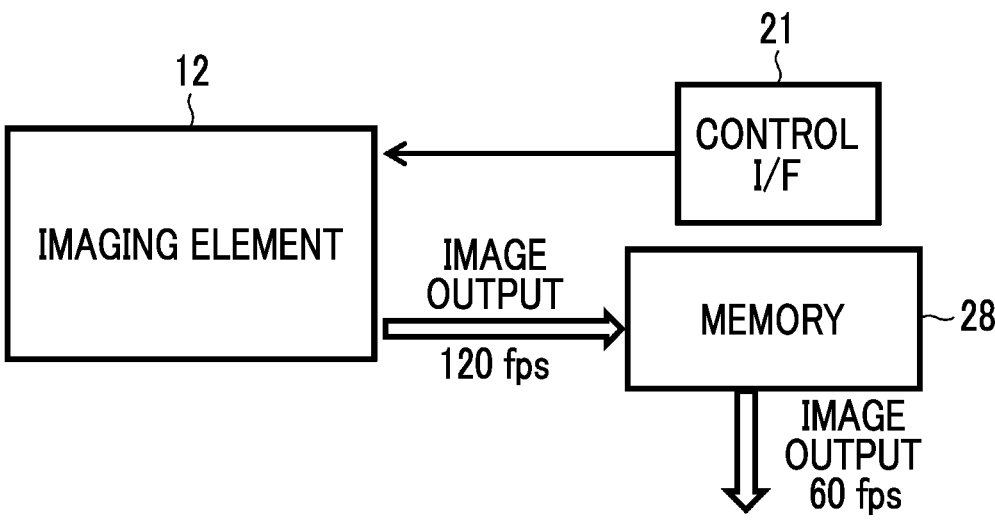
FIG. 14 is a block diagram of a main part of the imaging apparatus in a case where a frame rate at which an image is output is changed with respect to a frame rate of the imaging element.

FIG. 14 is a block diagram of a main part of the imaging apparatus in a case where a frame rate at which an image is output is changed with respect to the frame rate of the imaging element.

In the setting of outputting an image at a frame rate (second frame rate) lower than the frame rate (first frame rate) of the imaging element 12, in a case where the temperature of the imaging element 12 detected by the temperature detection unit 16 is equal to or more than the reference temperature (for example, 30° C.), the CPU 26 adds the frame image at the first frame rate and outputs the image at the second frame rate.

In FIG. 14, the CPU 26 changes the frame rate (first frame rate) at which the imaging element 12 is driven in accordance with the temperature of the imaging element 12 via the control I/F 21. In the example shown in FIG. 14, since the temperature of the imaging element 12 is 30° C. or more, the imaging element 12 is driven at a frame rate of 120 fps, and a frame image of 120 fps is read out from the imaging element 12 and is temporarily stored in the memory 28.

After performing image processing on the image data temporarily stored in the memory 28, the CPU 26 outputs the image to the LCD 32 at a frame rate (second frame rate) different from the frame rate of the imaging element 12. In the example shown in FIG. 14, the image data of 60 fps is output.

This is to cope with the fact that a frame rate (second frame rate) of the image output to a display such as the LCD 32 is determined by how the image is used while an optimum frame rate (first frame rate) of the imaging element 12 is determined by the temperature of the imaging element 12.

Figure 15:
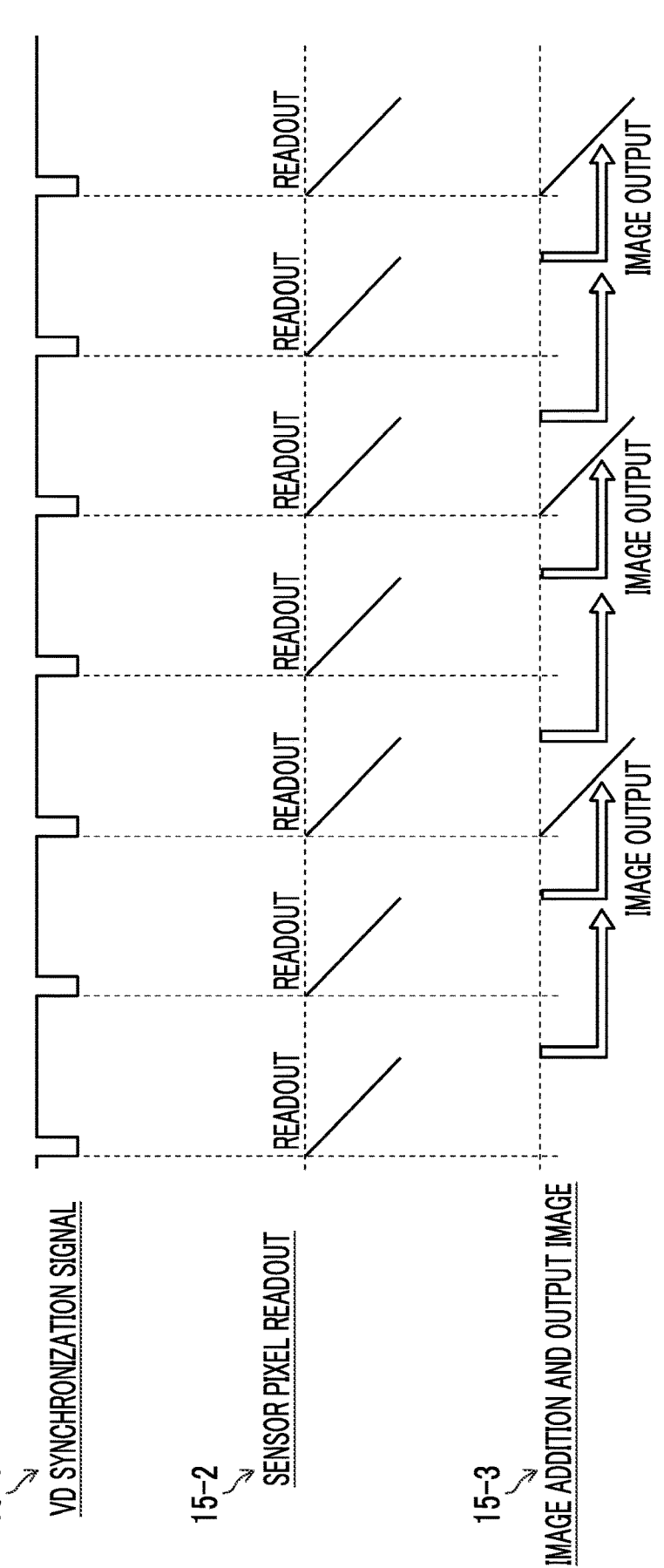
FIG. 15 is a timing chart showing a relationship between pixel readout from the imaging element and an output image.

FIG. 15 is a timing chart showing a relationship between pixel readout from the imaging element and the output image.

As shown in 15-1 of FIG. 15, for example, the imaging element 12 is driven by a vertical driving pulse (VD) synchronization signal corresponding to 120 fps, and a frame image is read out from the imaging element 12 at a frame rate of 120 fps in synchronization with the VD synchronization signal as shown in 15-2 of FIG. 15.

As shown in 15-3 of FIG. 15, the frame image at a frame rate of 120 fps that is read out from the imaging element 12 is added by two frames, and the frame image at a frame rate of 60 fps is output as an image.

Accordingly, it is possible not only to match the frame rate of image output, but also to set the exposure time to a substantially long time.

Figure 16:
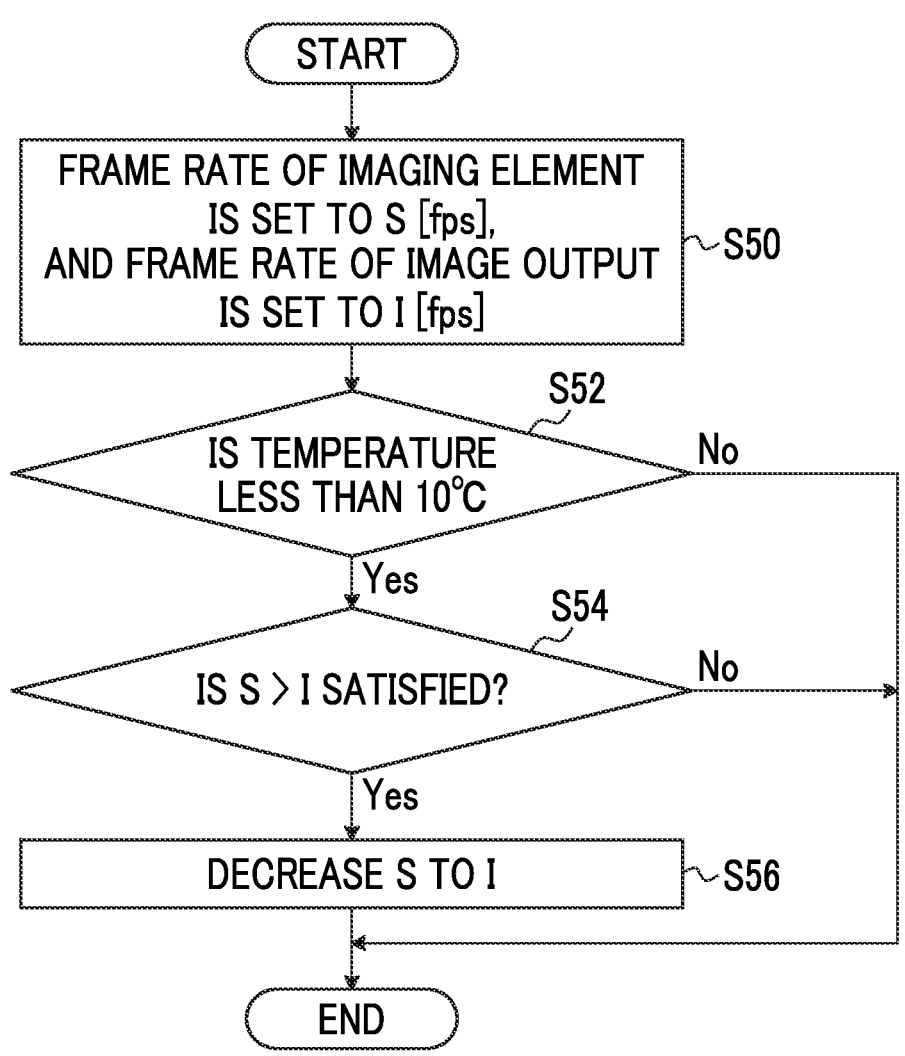
FIG. 16 is a flowchart showing an embodiment of control in a case where a frame rate at which the imaging element is driven and a frame rate of image output are different.

FIG. 16 is a flowchart showing an embodiment of control in a case where the frame rate at which the imaging element is driven and the frame rate of image output are different.

In FIG. 16, a frame rate (first frame rate) at which the imaging element 12 is driven is set to S [fps], and a frame rate (second frame rate) of the image output is set to I [fps] (Step S50).

The CPU 26 determines whether or not the temperature of the imaging element 12 is less than a reference temperature (10° C. in the present example) (Step S52). In a case where the temperature of the imaging element 12 is less than 10° C. (in a case of "Yes"), the CPU 26 determines whether or not S>I is satisfied (Step S54).

In a case where it is determined that S>I is satisfied in Step S54, the CPU 26 decreases S to I (Step S56).

In a case where the frame rate (I) of the image output of the imaging apparatus 1-2 can be set and the temperature of the imaging element 12 is low (less than 10° C.), the frame rate (S) of the imaging element 12 is decreased to the frame rate (I) of the image output.

Others

In the present embodiment, for example, the hardware structure of the processing unit that executes various types of processing, such as the CPU 26 of the imaging apparatus, is various processors as described below. The various processors include a central processing unit (CPU) which is a general-purpose processor functioning as various processing units by executing software (program), a programmable logic device (PLD) which is a processor capable of changing a circuit configuration after manufacturing such as a field programmable gate array (FPGA), a dedicated electric circuit, which is a processor having a circuit configuration exclusively designed to execute specific processing, such as an application specific integrated circuit (ASIC), and the like.

One processing unit may be composed of one of these various processors, or may be composed of two or more processors (for example, a plurality of FPGAs or a combination of the CPU and the FPGA) of the same type or different types. In addition, the plurality of processing units may be composed of one processor. As an example of the plurality of processing units that is composed of one processor, first, as represented by a computer such as a client or a server, a form in which one processor is composed of a combination of one or more CPUs and software and the processor functions as the plurality of processing units is possible. Second, as represented by a system on chip (SoC) or the like, a form of using a processor that implements functions of the entire system including the plurality of processing units in one integrated circuit (IC) chip is possible. Accordingly, the various processing units are configured using one or more of the various processors as a hardware structure.

Further, the hardware structure of these various processors is more specifically an electric circuit (circuitry) in which circuit elements such as semiconductor elements are combined.

In addition, the present invention is not limited to the embodiment and can be subjected to various modifications without departing from a spirit of the present invention.

EXPLANATION OF REFERENCES

1-1, 1-2: imaging apparatus
10: imaging lens
12: imaging element
14: cooling unit
16: temperature detection unit
18: I/F and signal controller
20: I/F
21: control I/F
22: communication I/F
24, 34: driver
26: CPU
27: bus
28: memory
30: EVF
32: LCD
36: operating unit
S10: Step
S12: Step
S14: Step S20: Step
S22: Step
S24: Step
S30: Step
S32: Step
S34: Step
S36: Step
S38: Step
S39: Step
S40: Step
S42: Step
S44: Step
S46: Step
S48: Step
S50: Step
S52: Step
S54: Step
S56: Step

What is claimed is:

1. An imaging apparatus comprising:
an imaging element having a photosensitive layer on a silicon substrate;
a cooling unit that cools the imaging element;
a temperature detection unit that detects a temperature of the imaging element; and
a processor configured to control the cooling unit based on a first frame rate at which the imaging element is driven and the temperature of the imaging element detected by the temperature detection unit,
wherein the processor controls the cooling unit through setting to a second temperature higher than a first temperature corresponding to a reference frame rate in a case where the first frame rate is higher than the reference frame rate, and controls the cooling unit through setting to a third temperature lower than the first temperature in a case where the first frame rate is lower than the reference frame rate.

2. The imaging apparatus according to claim 1, wherein the imaging element is sensitive to a short wavelength infra-red band.

3. The imaging apparatus according to claim 1, wherein the processor controls the cooling unit to perform cooling in a case where the first frame rate is lower than a reference frame rate.

4. The imaging apparatus according to claim 1, further comprising:

a first memory that stores a target temperature according to a frame rate,
wherein the processor acquires a corresponding target temperature from the first memory according to the first frame rate, and controls the cooling unit based on the acquired target temperature and the temperature of the imaging element detected by the temperature detection unit.

5. The imaging apparatus according to claim 4, wherein the processor weakens or interrupts cooling of the imaging element by the cooling unit in a case where the temperature of the imaging element detected by the temperature detection unit is lower than the target temperature.

6. The imaging apparatus according to claim 1, wherein the processor drives the imaging element at the first frame rate and starts imaging in a case where the temperature of the imaging element detected by the temperature detection unit reaches a target temperature.

7. A control method of an imaging apparatus including an imaging element having a photosensitive layer on a silicon substrate, a cooling unit that cools the imaging element, a temperature detection unit that detects a temperature of the imaging element, and a processor, the control method comprising:
driving by the processor, the imaging element at a first frame rate to capture time-series images;
detecting by the temperature detection unit, the temperature of the imaging element; and
controlling by the processor, the cooling unit based on the first frame rate and the detected temperature of the imaging element, to cool the imaging element,
wherein, in cooling of the imaging element,
in a case where the first frame rate is higher than the reference frame rate, the cooling unit is controlled through setting to a second temperature higher than a first temperature corresponding to a reference frame rate, and
in a case where the first frame rate is lower than the reference frame rate, the cooling unit is controlled through setting to a third temperature lower than the first temperature.

8. The control method of an imaging apparatus according to claim 7, wherein the imaging element is sensitive to a short wavelength infra-red band.

* * * * *